United States Patent [19]

Nagase et al.

[11] Patent Number: 4,617,887

[45] Date of Patent: Oct. 21, 1986

[54] PISTON FOR INTERNAL COMBUSTION ENGINE

[75] Inventors: Hidenobu Nagase, Wako; Atsushi Umemoto, Asaka, both of Japan

[73] Assignee: Honda Giken Kogyo Kabushiki Kaisha, Tokyo, Japan

[21] Appl. No.: 718,050

[22] Filed: Mar. 29, 1985

[30] Foreign Application Priority Data

Mar. 31, 1984 [JP] Japan .................. 59-63995

[51] Int. Cl.[4] .............................................. F02F 3/26
[52] U.S. Cl. .................. 123/279; 123/193 P
[58] Field of Search .......... 123/273, 276, 279, 193 P, 123/197 AB

[56] References Cited

U.S. PATENT DOCUMENTS

| 4,013,057 | 3/1977 | Guenther | 123/193 P |
|---|---|---|---|
| 4,018,194 | 4/1977 | Mitchell et al. | 123/276 |
| 4,056,044 | 11/1977 | Kamman et al. | 92/159 |
| 4,073,220 | 2/1978 | Guenther | 92/190 |
| 4,083,292 | 4/1978 | Goloff | 92/176 |
| 4,114,519 | 9/1978 | Speaight | 92/221 |
| 4,129,108 | 12/1978 | Elsbett et al. | 123/193 P |
| 4,161,165 | 7/1979 | Belush et al. | 123/193 P |
| 4,180,027 | 12/1979 | Taylor | 123/41.35 |
| 4,270,494 | 6/1981 | Garter et al. | 123/193 P X |
| 4,494,501 | 1/1985 | Ludovico | 123/193 P X |
| 4,531,269 | 7/1985 | La Bouff | 123/193 P X |

FOREIGN PATENT DOCUMENTS

| 0067967 | 12/1982 | European Pat. Off. | 123/193 P |
|---|---|---|---|
| 0511422 | 10/1930 | Fed. Rep. of Germany | 123/279 |
| 0750635 | 8/1933 | France | 123/279 |
| 0070039 | 4/1983 | Japan | 123/193 P |

Primary Examiner—Willis R. Wolfe, Jr.
Attorney, Agent, or Firm—Armstrong, Nikaido, Marmelstein & Kubovcik

[57] ABSTRACT

A piston for an internal combustion engine is disclosed which comprises a piston main body having an opening in the top surface thereof and a cavity forming member having a combustion chamber form the top surface thereof which is mounted in the opening of the piston main body. The diameter of the cavity forming member is less then the diameter of the piston main body and the top surface of the cavity forming member is in alignment with the top surface of the piston main body. A piston pin is mounted in the piston main body and the cavity forming member is supported by the piston pin. Further a connecting rod is connected to the piston pin whereby the connecting rod is coupled to the main piston body.

1 Claim, 4 Drawing Figures

4,617,887

PISTON FOR INTERNAL COMBUSTION ENGINE

BACKGROUND OF THE INVENTION

1. Field of the Invention

This invention relates to a piston for an internal combustion engine, primarily a diesel engine. The piston is of the type having a cavity for a combustion chamber near the center of the top surface thereof.

2. Description of the Prior Art

FIG. 1 illustrates a prior art piston of the type disclosed in Japanese Unexamined Publication Sho 58-72654, for example, which has a cavity forming member b provided with a cavity a at a central area of the top surface thereof. The member b is a separate element from a piston main body c, and is supported on a piston pin d provided laterally in the piston body c. The cavity forming member b is made of a low thermal conductive material such as cast iron or the like, and the piston main body c is made of a small specific gravity material such as an aluminum alloy or the like so that the overall weight of the piston is small. This has the advantage that the engine can be operated at a high speed and the weight can be decreased.

A piston of this type, however, is usually constructed so that a top surface of the cavity forming member b has an enlarged flange-shaped portion e having the same diameter as the piston main body c, and the cavity forming member b with the enlarged flange-shaped portion e is placed on the top surface of the piston main body c, as shown in FIG. 1. In this arrangement the cavity forming member b is mounted on the piston main body c with a small clearance f formed therebetween for allowing for movement due to a difference in the thermal expansion coefficient between the member b and the piston main body c. As a result, the cavity forming member b often has a swivel motion corresponding to the extent of the clearance f about the piston pin d. There is a possibility of a scuffing or biting between the flange-shaped portion e and a cylinder as a result of the swivel motion.

SUMMARY OF THE INVENTION

It is the object of the present invention to provide a piston of the type with a cavity for a combustion chamber located in the vicinity of the center of the top surface thereof which eliminates the swivel motion found in prior art devices.

The piston of the present invention has a cavity forming member for forming the cavity provided separately from the piston main body, and the cavity forming member is supported on a piston pin positioned laterally in the piston main body. The cavity forming member of the present invention is smaller in diameter than the piston main body, and is mounted in an opening located in the vicinity of the center of the top surface of the piston main body such that the top surface of the cavity forming member and the top surface of the piston main body are substantially in alignment with one another.

DETAILED DESCRIPTION OF THE PREFERRED EMBODIMENT

Figure 1:
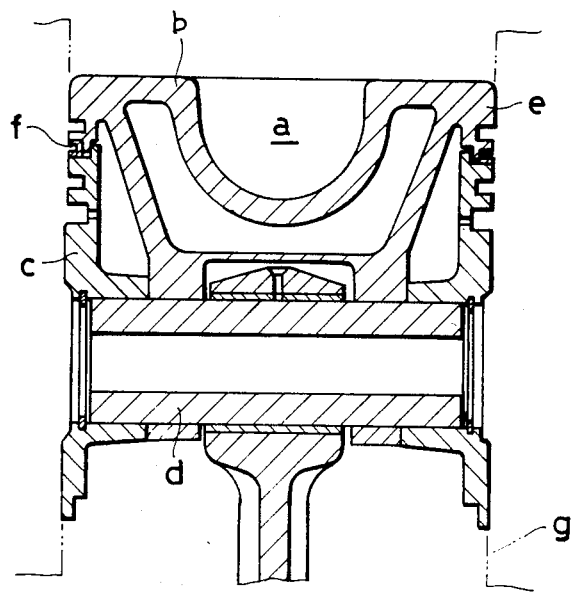
FIG. 1 is a sectional view of a conventional engine.
Figure 2:
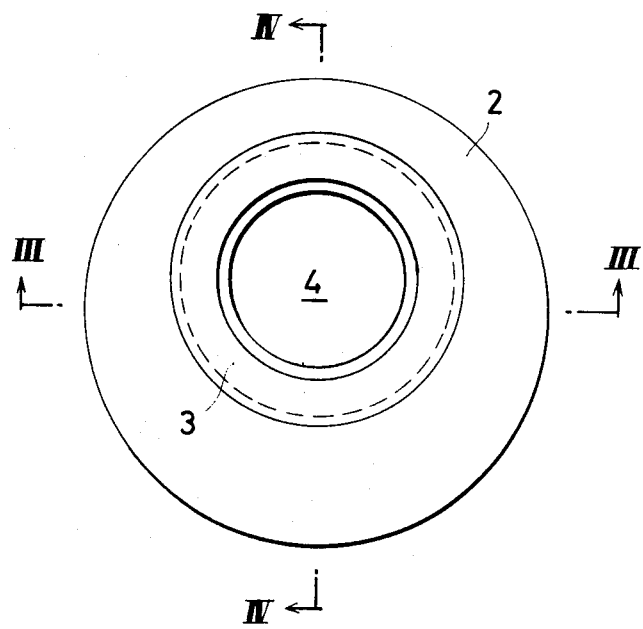
FIG. 2 is a top plan view of a piston of the present invention.
Figure 3:
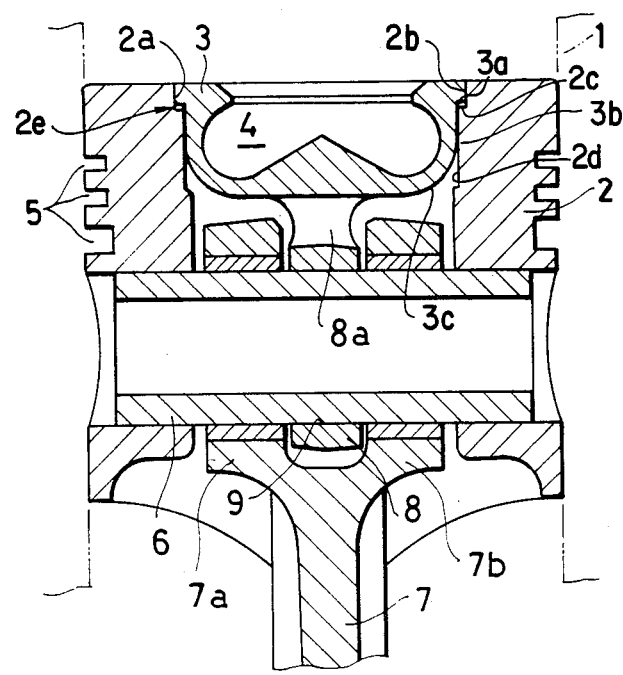
FIGS. 3 and 4 are sectional views taken along the lines III—III and IV—IV, respectively, in FIG. 2.
Figure 4:
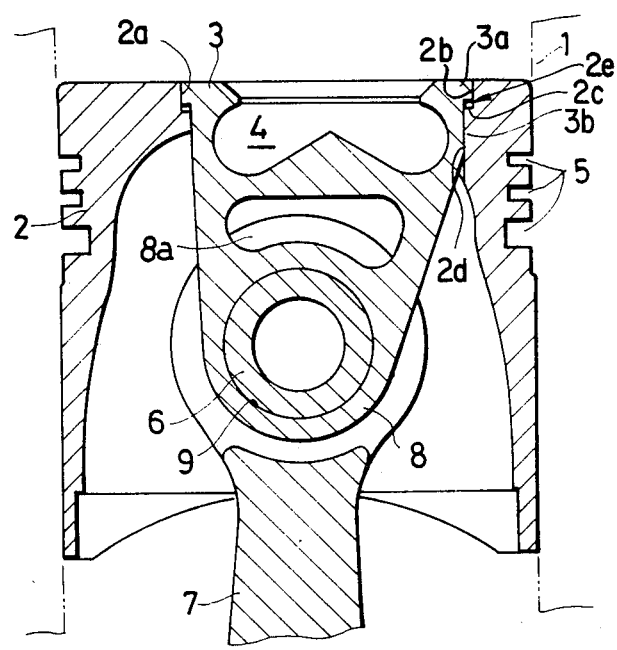

Referring to FIGS. 2 through 4, a cylinder 1 has therein a piston main body 2 and a cavity forming member 3 having a cavity 4 which forms a combustion chamber. The piston body 2 is provided at its upper portion with plural grooves 5 for piston rings and at its lower portion with a piston pin 6 which extends laterally. The piston body 2 is pivotally attached to a connecting rod 7 through the piston pin 6. The cavity forming member 3 has a leg 8 projecting downward from the bottom portion thereof, and is pivotally supported on the piston pin 6 through an attaching opening 9 formed in the leg 8.

The cavity forming member 3 is formed into a tubular casing 3b which is smaller in diameter than the piston main body 2, and the tubular casing 3b is mounted in an opening 2a formed in the vicinity of the center of the top surface of the piston main body 2. The top surface of the cavity forming member 3 and the top surface of the piston main body 2 are substantially in alignment with one another.

The opening 2a made in the piston main body 2 has a large diameter opening portion 2b located at its upper part, and a small diameter opening portion 2d located below the same and connected thereto through a shoulder portion 2c. The cavity forming member 3 is formed at its top portion with a flange 3a having its outer circumferential surface in slidable contact with an inner circumferential surface of the large diameter opening portion 2b. A gap 2e is formed between a lower surface of the flange 3a and an upper surface of the shoulder portion 2c facing the same.

An outer circumferential surface 3b of the cavity forming member 3 which is in slidable contact with an inner circumferential surface of the small diameter opening portion 2d is formed at a position above a bottom surface of the cavity 4. A bottom wall portion 3c of the cavity forming member 3 located below the slide contact surface 3b is made is free from contact with the piston main body 2.

In the illustrated embodiment, the leg 8 is provided with an opening 8a between the attaching opening 9 and the bottom portion of the tubular casing 3b so that the cavity forming member 3 is reduced in weight and the heat thereof is prevented from being transmitted to the piston pin 6.

The leg 8 is positioned at the middle of the piston pin 6, and the connecting rod 7 has two diverging portions 7a and 7b and is attached to the pin 6 such that the leg 8 is positioned between the diverging portions 7a and 7b. Thus the action of an explosion force generated during an explosion stroke may be distributed by way of the cavity forming member 3 and the piston body 2 on the piston pin 6 to the center portion of the piston pin 6 between the diverging portions 7a and 7b of the connecting rod 7 and to both sides of the diverging portions 7a and 7b.

The cavity forming member 3 consists of a high strength and low thermal conductive material such as cast iron, stainless steel, ceramics or the like, and the piston body 2 consists of a small specific gravity material such as an aluminum alloy or the like. In addition, in this case, considering the difference in thermal expansion coefficient between the two members 2 and 3, the top surface of the cavity forming member 3 may be positioned a little higher than that of the piston main body 2.

Next, the operation of the piston of this invention will be explained as follows:

The piston body 2 is slidably mounted in the cylinder 1. When the engine is operating, only the piston main body 2 is in slidable contact with an inner wall of the cylinder 1, and the cavity forming member 3 is never brought into contact with the inner wall of the cylinder 1. Thus even if the member 3 has a swivel motion any scuffing or biting between member 3 and the cylinder 1 is avoided.

Thus, according to the present invention, the cavity forming member is smaller in diameter than the piston main body, and the cavity forming member is mounted in an opening generally located at the center of, or in the vicinity of, the piston main body such that the top surface of the cavity forming member and the top surface of the piston body are substantially in alignment with one another. Scuffing between the cavity forming member and the cylinder is thus eliminated. Consequently, the main body and the cavity forming member will be improved indurability, and additionally, the cavity forming member is not in a slidable contact with an inner wall of the cylinder which is forcibly cooled, and a thermal loss from the cavity forming member can be reduced and as a result the engine can be improved in its thermal efficiency.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A piston for an internal combustion engine comprising:

(a) a piston main body made of a first material and having an opening in a top surface thereof, said opening having an upper large diameter portion and a lower small diameter portion with a shoulder defined therebetween;
    (b) a cavity forming member having a combustion chamber cavity formed in a top surface thereof and being made of a second material having a different thermal expansion coefficient than said first material, the diameter of said cavity forming member being less than the diameter of said piston main body, said cavity forming member being mounted in said opening of said piston main body; said cavity forming member including a flange at a top portion thereof having an outer circumferential surface in slidable contact with an inner circumferential surface of said large diameter opening portion, a tubular casing having an outer circumferential surface in slidable contact with an inner circumferential surface of said small diameter opening portion only along a portion positioned above a bottom surface of said cavity, a lower surface of said flange and an upper surface of said shoulder defining a gap therebetween, a bottom wall portion located below said outer circumferential surface of said tubular casing, said bottom wall portion being free from contact with said piston main body, a top surface in alignment with said top surface of said piston main body, and a leg portion extending from said bottom wall portion and having an opening therein;
    (c) a connecting rod including coupling means having two diverging portions, each portion having an opening therein, a part of said leg portion of said cavity forming member being positioned between said two diverging portions of said connecting rod; and
    (d) a piston pin mounted in said piston main body and extending through said openings in said two diverging portions of said connecting rod and said opening in said leg portion of said cavity forming member.

* * * * *